United States Patent
Kang et al.

(10) Patent No.: US 9,245,152 B2
(45) Date of Patent: Jan. 26, 2016

(54) METHOD FOR AUTHENTICATING A STORAGE DEVICE, MACHINE-READABLE STORAGE MEDIUM, AND HOST DEVICE

(75) Inventors: Bo-Gyeong Kang, Seoul (KR); Jung-Wan Ko, Yongin-si (KR); Sung-Hee Hwang, Suwon-si (KR); Byung-Rae Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 13/696,760

(22) PCT Filed: May 9, 2011

(86) PCT No.: PCT/KR2011/003443
§ 371 (c)(1),
(2), (4) Date: Nov. 7, 2012

(87) PCT Pub. No.: WO2011/139134
PCT Pub. Date: Nov. 10, 2011

(65) Prior Publication Data
US 2013/0061287 A1    Mar. 7, 2013

(30) Foreign Application Priority Data
May 7, 2010    (KR) .................. 10-2010-0043220

(51) Int. Cl.
*G06F 21/00*    (2013.01)
*G06F 21/73*    (2013.01)
*G11B 20/00*    (2006.01)
*H04L 9/32*    (2006.01)

(52) U.S. Cl.
CPC .......... *G06F 21/73* (2013.01); *G11B 20/00123* (2013.01); *G11B 20/00862* (2013.01); *G11B 20/00963* (2013.01); *G11B 2220/60* (2013.01); *H04L 9/3263* (2013.01)

(58) Field of Classification Search
CPC ...................................................... G06F 21/73
See application file for complete search history.

(56) References Cited

U.S. PATENT DOCUMENTS

| | | | |
|---|---|---|---|
| 5,412,718 | A | 5/1995 | Narasimhalu et al. |
| 6,747,930 | B1 | 6/2004 | Weldon et al. |
| 7,017,044 | B1 | 3/2006 | Carpenter et al. |
| 2006/0136729 | A1 | 6/2006 | Doyle |
| 2009/0158044 | A1 | 6/2009 | Kirovski |

FOREIGN PATENT DOCUMENTS

| | | |
|---|---|---|
| CN | 1253653 | 5/2000 |
| CN | 101567218 | 10/2009 |
| EP | 0 644 474 | 3/1995 |
| WO | WO 98/41979 | 9/1998 |

*Primary Examiner* — Devin Almeida
(74) *Attorney, Agent, or Firm* — The Farrell Law Firm, P.C.

(57) ABSTRACT

A method for authentication, by a host device, of a storage device having a plurality of unit storage areas comprises acquiring information on the distribution of locations of defect referenceive areas to be used for uniquely identifying the storage device, sampling the unit storage areas of the storage device, identifying the distribution of locations of physically defective areas among the sampled areas, determining the similarity between the acquired distribution of locations and the identified distribution of location, and authenticating the storage device according to the result of the determination.

19 Claims, 6 Drawing Sheets

METHOD FOR AUTHENTICATING A STORAGE DEVICE, MACHINE-READABLE STORAGE MEDIUM, AND HOST DEVICE

PRIORITY

This application is a National Phase Entry of PCT International Application No. PCT/KR2011/003443, which was filed May 9, 2011, and claims priority to Korean Patent Application No. 10-2010-0043220, filed in the Korean Intellectual Property Office, on May 7, 2010, the content of each of which is incorporated herein by reference.

BACKGROUND OF THE INVENTION

1. Field of the Invention

The present invention relates generally to an authentication method and apparatus for identifying a target device, and more particularly, to a method and apparatus for authenticating a storage device.

2. Description of the Related Art

As technologies such as Digital Rights Management (DRM), copy protection, and the like have been required to secure content, a technology to authenticate a storage device including a Non-Volatile Memory (NVM) device, such as a Solid State Disk (SSD) and a flash memory card, and the like has been required. That is, a technology that encrypts content and verifies suitability of hardware (H/W) of the storage device has been required.

Although the DRM technology, a Content Protection for Recordable Media (CPRM) technology for a Secure Digital (SD) card, an Advanced Access Content System (AACS) for a Blue-ray disc provide a device authentication method based on a Public Key Infrastructure (PKI) or a cryptographic technology, it is difficult to prevent cloning the storage device.

Conventionally, there has been a technology that inserts a watermark or a fingerprint into a chip of H/W while the chip is designed, to identify H/W in which a problem occurs. However, the technology traces security piracy after the problem occurs, fails to prevent the cloning in advance, is inefficient in mass production, and is difficult to be used as a method of verifying suitability of the device at the time of transaction.

SUMMARY OF THE INVENTION

Accordingly, the present invention has been made to solve the above-mentioned problems occurring in the prior art, and provides a method that prevents cloning in advance, is efficient in mass production, and verifies suitability of a device at the time of transaction.

A most basic required security technology in a scenario that sells/rents high-value content using a storage device or a memory device is an anti-cloning technology that prevents massive illegal H/W cloning. To increase complexity of an H/W cloning attack, it is desirable to utilize a unique property of each storage device, that is, a physical property that has a low collision probability. However, due to a size of a memory increased up to a few through a few hundred Gigabytes, it is inefficient to use a physical property of an entire memory. Also, a method that uses a predetermined limited area may decrease the complexity of the cloning attack and thus, it may be inappropriate to be used as the anti-cloning technology.

Accordingly, aspects of the present invention provide a method that authenticates a storage device by utilizing a unique physical property of the storage device (for example, a positional distribution of a reference unit storage area having a physical defect such as a bad block), a method of effectively authenticating the storage device by sampling a few of all unit storage areas of the storage device, and a method of updating a sampling function. Briefly, the unit storage areas may form the storage device, and may refer to storage areas that are distinguishable and have the same size, for example, pages or cells (bits, bytes, words, and the like). Also, a general memory is configured in a layer structure in which cells form a page, pages form a block, and blocks form the entire memory.

According to embodiments of the present invention, when a physical property of a storage device is utilized for authenticating a device and the like, efficiency in authenticating a storage medium may be maximized using one of a step of sampling a few of all unit storage areas, a step of updating a sampling function used in the sampling step, and a step of determining subsumption relation or similarity between a result of a test with respect to the sampled areas and a reference physical property, or a combination thereof.

In particular, according to embodiments of the present invention, efficiency in a verification step may be maximized by sampling a few of all unit storage areas. Also, a low collision probability, comparable to an authentication method performed with respect to all unit storage areas, may be secured by applying a random sampling function and utilizing information of areas greater than or equal to a predetermined threshold value.

Also, according to embodiments of the present invention, the threat of cloning caused due to a weak point and disclosure of a sampling function may be minimized by updating the sampling function. For example, when a fact that a predetermined sampling function deterministically uses second, third, and tenth block information of a physical property is disclosed, complexity of a cloning attack may be decreased to cloning of the second, third, and tenth block information, as opposed to cloning of an entire memory. Accordingly, embodiments of the present invention may increase the complexity of the cloning attack by using variable sampling and updating the sampling function.

According to an aspect of the present invention, there is provided a method for a host device to authenticate a storage device having a plurality of unit storage areas, the method including obtaining information associated with a positional distribution of defect reference areas used for uniquely identifying the storage device, sampling the unit storage areas of the storage device, identifying a positional distribution of areas having physical defects from among the sampled areas, determining similarity between the obtained positional distribution and the identified positional distribution, and authenticating the storage device based on a result of the determination.

According to another aspect of the present invention, there is provided non-transitory a machine-readable storage medium having recorded thereon a program for executing a method for a host device authenticating a storage device having a plurality of unit storage areas, the method including obtaining information associated with a positional distribution of defect reference areas used for uniquely identifying the storage device, sampling the unit storage areas of the storage device, identifying a positional distribution of areas having physical defects from among the sampled areas, determining similarity between the obtained positional distribution and the identified positional distribution, and authenticating the storage device based on a result of the determination.

BRIEF DESCRIPTION OF THE DRAWINGS

The above and/or other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, various embodiments of the present invention are described in detail with reference to the accompanying drawings. In the following description, a detailed description of known functions and configurations is omitted to avoid obscuring the subject matter of the present invention.

Figure 1:
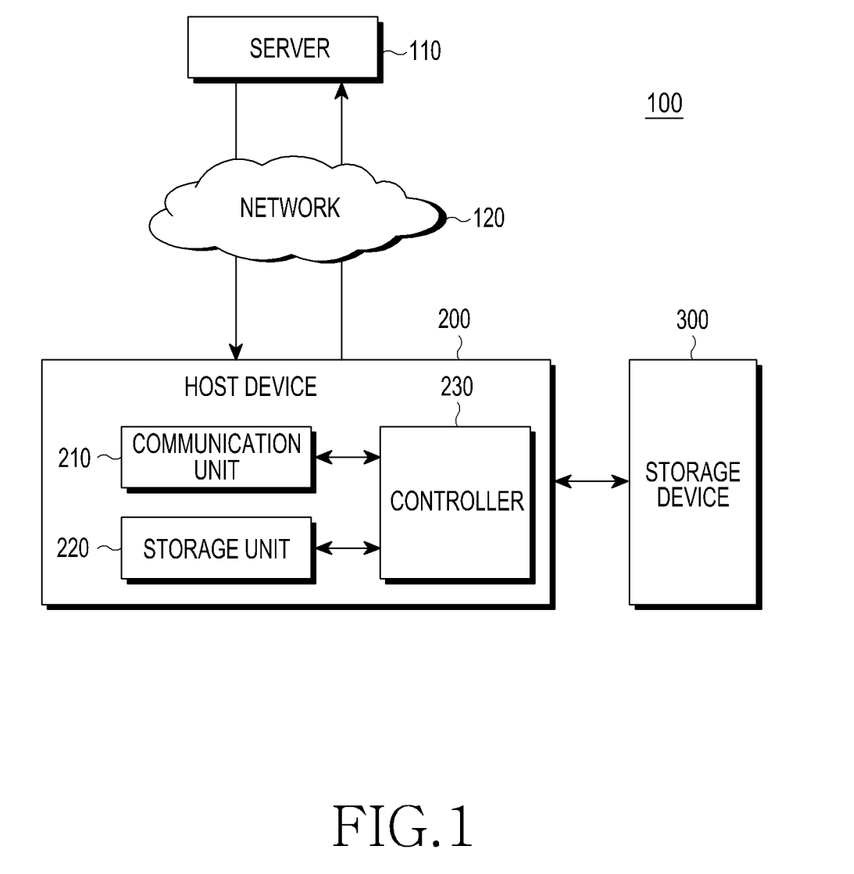
FIG. 1 is a diagram illustrating a configuration of an authentication system according to, an embodiment of the present invention.

FIG. 1 is a diagram illustrating a configuration of an authentication system according to an embodiment of the present invention.

An authentication system 100 includes a sever 110, a host device 200 that is connected to the server 110 through a network 120 such as the Internet, and a storage device 300 that is disposed inside or outside the host device 200 and is wire or wirelessly connected to the host device 200.

Examples of the host device 200 include, but are not limited to, a computer, a laptop, a mobile device, a portable device, an Internet protocol television, a portable media player, and a Personal Digital Assistant (PDA). Examples of the network 120 include, but are not limited to, a Local Area Network (LAN), a Wireless Local Area Network (WLAN), a Wide Area Network (WAN), the Internet, and a Small Area Network (SAN).

The host device 200 requests update information of a sampling function from the server 110, and the server 110 transmits update data to the host device 200. The server 110 compares a version of the sampling function received from the host device 200 and a version of a recent sampling function stored in a database (not illustrated) of the server 110, and transmits, to the host device 200, the recent sampling function itself or difference data corresponding to a difference between the two versions of the sampling functions when the version of the received sampling function is lower than the version of the recent sampling function. The server 110 transmits the difference data and update data including a command to instruct a copy, insertion, or deletion of data, to reduce a size of the update data. When the version of the received sampling function is identical to the version of the recent sampling function, the server 110 notifies the host device 200 that updating is not required through a message. When the server 110 does not perform the comparison process, the server transmits the recent sampling function to the host device 200. The comparison process is then performed in the host device 200, and the host device 200 determines whether to perform updating based on a result of the comparison.

Examples of the storage device 300 include, but are not limited to, a Non-Volatile Memory (NVM) such as a Solid State Disk (SSD) and a flash memory card. Although embodiments of the present invention are described based on a Negated AND (NAND) type flash memory. Examples of the storage device include, but are not limited to, a floppy disk, a flexible disk, a hard disk, a magnetic tape, a Compact Disc Read-Only Memory (CD-ROM), an optical disc, a Blue-ray disc, a Random Access Memory (RAM), a Programmable Read-Only Memory (PROM), an Erasable PROM (EPROM), and a FLASH-EPROM.

Figure 2:
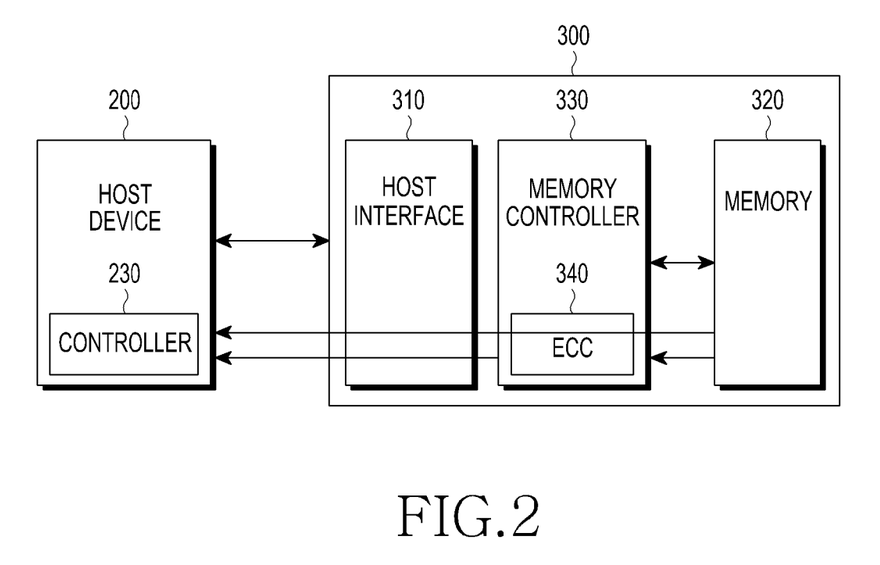
FIG. 2 is a diagram illustrating a configuration of a storage device of FIG. 1, according to an embodiment of the present invention.
Figure 3:
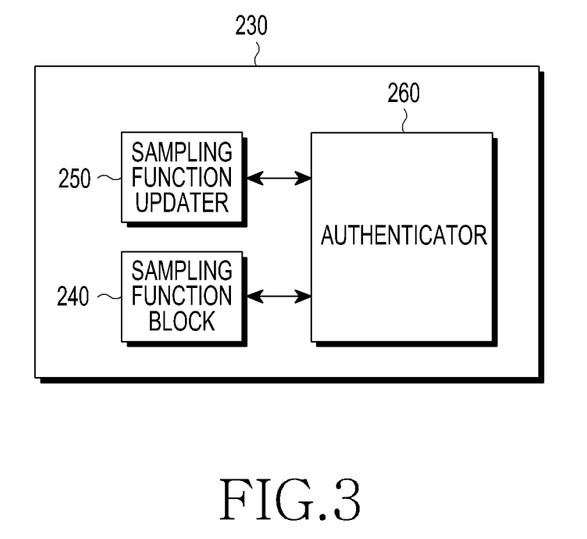
FIG. 3 is a diagram illustrating a configuration of a controller of FIG. 1, according to an embodiment of the present invention.

FIG. 2 is a diagram illustrating a configuration of the storage device 300 of FIG. 1. FIG. 3 is a diagram illustrating a configuration of the controller 230 of FIG. 1. For example, the host device 200 may be a personal computer, and the storage device 300 may be a NAND flash memory device contained in a memory slot of the personal computer. In this example, the host device 200 and the storage device 300 perform data communication through a bus in the host device 200.

The host device 200 includes a controller 230 corresponding to a verifier, and the controller 230 authenticates the storage device 300. Authentication of the storage device 300 is performed through software and hardware authentication procedures. The controller 230 includes an authenticator to perform software and hardware authentication, a sampling function block 240 to set a sampling size and to perform sampling of unit storage areas of the storage device 300 based on a sampling function for hardware authentication, and a sampling function updater 250 to select a sampling function and to update the sampling function.

The host device 200 includes a wired or wireless communication unit 210 to perform communication with the server 110, and a storage unit 220 for storing data.

The storage device 300 includes a host interface 310 to perform data communication with the host device 200, a memory 320 including unit storage areas having the same size, and a memory controller 330 to perform data communication with the controller 230 of the host device 200, to provide a response in response to a request from the host device 200, and to output, to the memory 320, a control command with respect to a predetermined unit storage area, such as reading, writing (that is, programming), or deleting. The memory controller 330 may include an Error Correction Code (ECC) to detect and correct an error included in data read from the memory 320.

The error detection and correction technologies effectively restore data that is damaged by various causes, such as during a process of storing data in a memory, and by perturbations of a data transmission channel through which the data is transmitted from a source to a destination. Various methods to detect and correct damaged data include a Reed-Solomon (RS) code, a Hamming code, a Bose-Chaudhuri-Hocquenghem (BCH) code, a Cyclic Redundancy Code (CRC) code, and the like. In cases where a Non-Volatile Memory (NVM) device is utilized, source data from a host device is stored in a memory together with ECC data. The ECC data is used for correcting an error occurring during a read operation of the memory, and the number of error bits that may be corrected by the ECC data may be limited.

Figure 4:
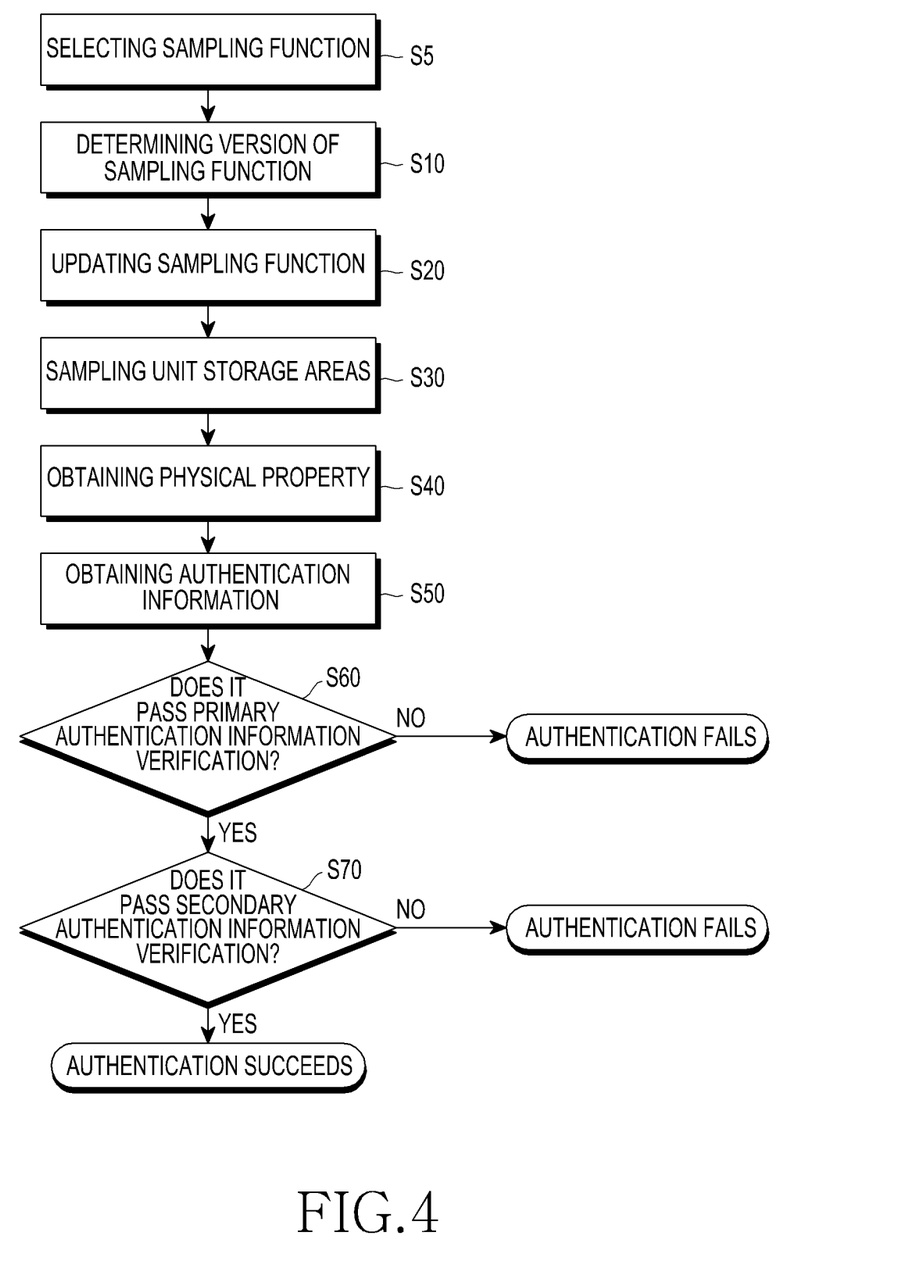
FIG. 4 is a flowchart illustrating a method of authenticating a storage device, according to an embodiment of the present invention.

FIG. 4 is a flowchart illustrating a method of authenticating a storage device according to an embodiment of the present invention.

The authentication method includes selecting a sampling function, in Step S5, determining a version of the sampling function, in Step S10, updating the sampling function, in Step S20, sampling unit storage areas, in Step S30, obtaining a physical property of sampled unit storage areas, in Step S40, obtaining authentication information, in Step S50, performing primary authentication information verification, in Step S60, and performing secondary authentication information verification, in Step S70.

In selecting the sampling function, in Step S5, the sampling function updater 250 selects one of a plurality of different types of sampling functions stored in the storage unit 220 of the host device 200. The sampling function updater 250 requests sampling function selection information from the storage device 300, and the memory controller 330 of the storage device 300 transmits the sampling function selection information stored in the memory 320 to the host device 200. For example, the sampling function selection information may have a predetermined manufacturer, or may be in a form of a file stored in the memory 320. The sampling function selection information may be information that designates a predetermined type (or category) of sampling function, and the information may be a number mapped to a predetermined type of sampling function (for example, 1 may correspond to a first type, 2 may correspond to a second type, etc.), or may be a predetermined type, condition, or the like. The sampling function selection information may further include other information such as a variant or an initial value input to the predetermined type of sampling function. The sampling function updater 250 may select a corresponding sampling function based on the sampling function selection information received from the storage device 300. The sampling function selection information designates a predetermined type of sampling function, and the designated type of sampling function may not be included in the host device 200 and thus, the sampling function selection information may designate various types of sampling functions based on priorities. For example, the sampling function updater 250 may select a sampling function of a second priority when a sampling function of a first priority does not exist. When the designated type of sampling function is not stored in the host device 200, the sampling function updater 250 may receive the designated type of sampling function from the server 110 or the storage device 300. Thus, updating includes the reception of a sampling function.

Determining the version of the sampling function, in Step S10 and updating the sampling function, in Step S20 are described assuming that the designated type of sampling function is stored in the host device 200. However, in other cases, the designated type of sampling function stored in one of the server 110 and the storage device 300 may be received or the designated type of sampling functions stored in the server 110 and the storage device 300 may be compared and received.

In determining the version of the sampling function, in Step S10, the sampling function updater 250 compares a version of a selected sampling function stored in the storage unit 220 of the host device 200 (hereinafter, referred to as a first sampling function) with a version of a sampling function of another available device, so that the sampling function block 240 may use a recent sampling function.

When the host device 200 operates in an off-line mode, the sampling function updater 250 compares the version of the first sampling function and a version of a sampling function stored in the storage device 300 (hereinafter, referred to as a second sampling function). The sampling function updater 250 requests the second sampling function or the version of the second sampling function, and the memory controller 330 of the storage device 300 transmits the second sampling function or the version of the second sampling function stored in the memory 320 to the host device 200. In this example, the second sampling function stored in the memory 320 may be encrypted by a License agency or a reliable third party so that only a legal host device may decrypt the second sampling function, and the sampling function updater 250 may decrypt the second sampling function received from the storage device 300 through use of an encryption key that the sampling function updater 250 is aware of in advance. The sampling function updater 250 compares the version of the decrypted second sampling function or the version of the second sampling function with the version of the first sampling function.

When the host device 200 operates in an on-line mode, the sampling function updater 250 requests a sampling function stored in the server 110 (hereinafter, referred to as a third sampling function) or a version of the third sampling function through use of the wired or wireless communication unit 210, and the server 110 transmits, to the host device 200, the third sampling function or the version of the third sampling function stored in a database (not illustrated). The sampling function updater 250 compares the received third sampling function or the version of the third sampling function with the version of the first sampling function.

In updating the sampling function, in Step S20, the sampling function updater 250 may update the first sampling function to be used by the sampling function block 240. When the version of the first sampling function is lower than the version of the second or third sampling function, the first sampling function may be replaced with the second or third sampling function. Selectively, the sampling function updater 250 determines the version of the second sampling function stored in the storage device 300, and when the version of the second sampling function is lower than the version of the third sampling function, the sampling function updater 250 may replace the second sampling function with the third sampling function. In this example, the sampling function updater 250 may encrypt the third sampling function received from the server 110 through use of an encryption key that another legal host device may be aware of (for example, an encryption key provided from a License agency of the storage device) so that the other legal host device may decrypt the encrypted third sampling function, and may store the encrypted third sampling function in the storage device 300.

In the present embodiment of the present invention, updating of a sampling function is illustrated, and update data of the sampling function may be the sampling function itself or variants input to the sampling function. Referring to Equations (1) and (2), variants may be input to a sampling function and the variants may be received from the outside of the host device 200 through the updating Step S20.

Also, in the present embodiment of the present invention, even when the host device 200 operates in an on-line mode, the host device 200 may operate an operation performed in the off-line mode. The host device 200 compares at least two of the first through third sampling functions, and may select a recent sampling function or an appropriate sampling function.

In sampling the unit storage areas, in Step S30, the sampling function block may sample (select) unit storage areas corresponding to a predetermined sampling size, based on the predetermined or previously obtained sampling size. A size of unit storage areas of the memory 320 (for example, a number of unit storage areas), which are to be verified, that is, the sampling size, may be a value stored in advance, a value received from the server 100, a value obtained from the storage device 300, a value calculated from a predetermined calculation equation, or a value randomly set using a random number generator. When the sampling size is randomly set, a value that is less than a number of all blocks of the memory 320 may be set to be a maximum value.

The memory 320 may be formed of a plurality of blocks, and each block has a size of 64 Kbytes through 512 Kbytes and deletion may be performed based on a block unit. A single block may be formed of a plurality of pages, and each page has a size of 512 bytes through 8 Kbytes and may be a basic unit of reading and writing. An NOR flash memory may perform reading and writing based on a byte or word unit. Each page may have an additional data area which is referred to as an Out Of Band (OOB) or a spare area of a few through a few hundred bytes. The spare area may be used for recording bad block marking, ECC, file system information, and the like. The memory 320 may have a Bad Block Table (BBT) that records statuses of all the blocks of the memory 320, and each block may have a status of "good", "bad", or "reserved". In the embodiments of the present invention, the "reserved" status indicates a block that may not be programmed or deleted by a user who is different from a manufacturer of the storage device, and that may only be read by the user. The bad block table may be stored in a block (desirably, a block in the reserved status), and the bad block table may be stored in a block in the reserved status.

Figure 5:
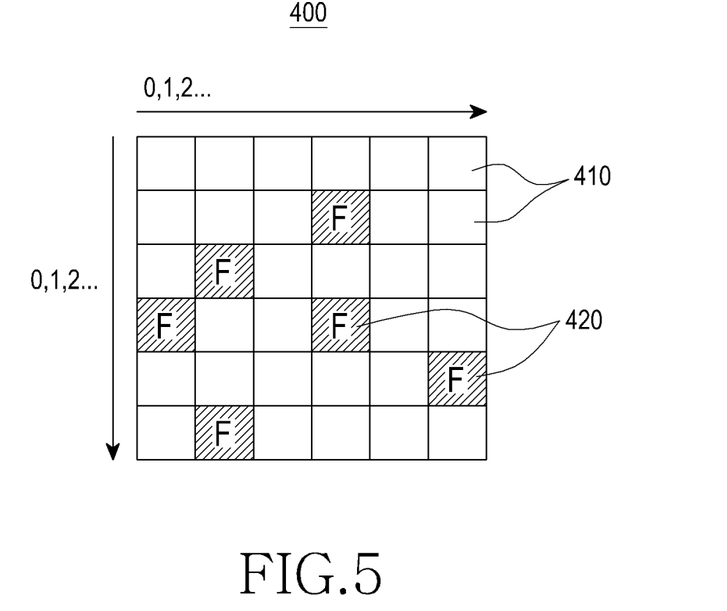
FIGS. 5 and 6 are diagrams illustrating setting of a sampling size, according to an embodiment of the present invention.
Figure 6:
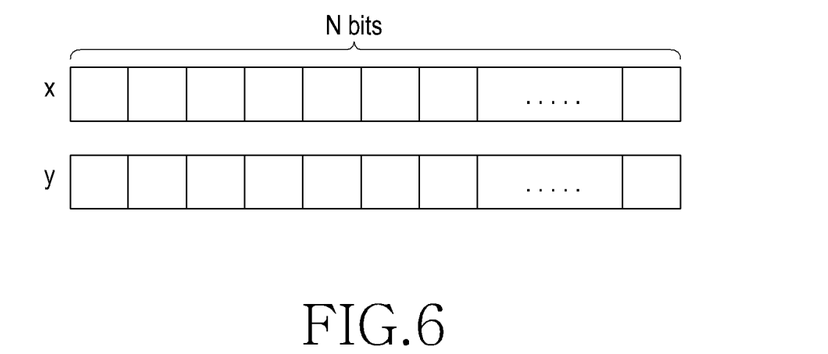

FIGS. 5 and 6 are diagrams illustrating a setting of a sampling size. FIG. 5 illustrates a bad cell pattern of a predetermined page, and a bad cell 420 having a physical defect may be expressed as "F" in a 6*6 cell array 410 and 420.

The sampling size may be set based on a probability that a pair of corresponding areas of two manufactured storage devices have an identical bad cell pattern (that is, an identical positional distribution).

Referring to FIG. 6, Equation (1) used for calculating the sampling size is expressed according to Equation (1) below.

$$CR = P(x=y) = (p^2 + q^2)^N \quad (1)$$

In Equation (1), CR denotes an average collision ratio, that is, a probability that a pair of corresponding areas x and y (each having N bits) of two manufactured storage devices have an identical pattern. $P(x=y)$ denotes a probability that $i^{th}$ bit of x and $i^{th}$ bit of y are identical to each other. p denotes a bit error rate (BER) and $q=1-p$. In the present example, a cell may correspond to a single bit. An approximation formulated in association with Equation (1) is expressed according to Equation (2) below.

$$X*C \sim X*X*CR \quad (2)$$

In Equation (2), X denotes production, and C denotes an expected value of an average collision probability. That is, when two storage devices from the production X, CR may be approximated to C/X.

For example, when $C=1/10000$, $X=10^8$, and $p=10^{(-7 \sim -9)}$ area substituted in Equation (1), N may be obtained, and N may be used for calculating the sampling size. In this example, N denotes a minimum number of cells to be sampled, and the calculated sampling size may be set to z pages including N cells or to blocks (z is a natural number).

Also, in Equations (1) and (2), a bit unit may be replaced with a block unit. In this example, N denotes a minimum number of blocks to be sampled.

Based on the set sampling size, locations of unit storage areas may be arbitrarily set. That is, unit storage areas corresponding to the set sampling size may be sampled from a predetermined location of the memory 320, or unit storage areas may be randomly sampled through use of a random number generator.

Figure 7:
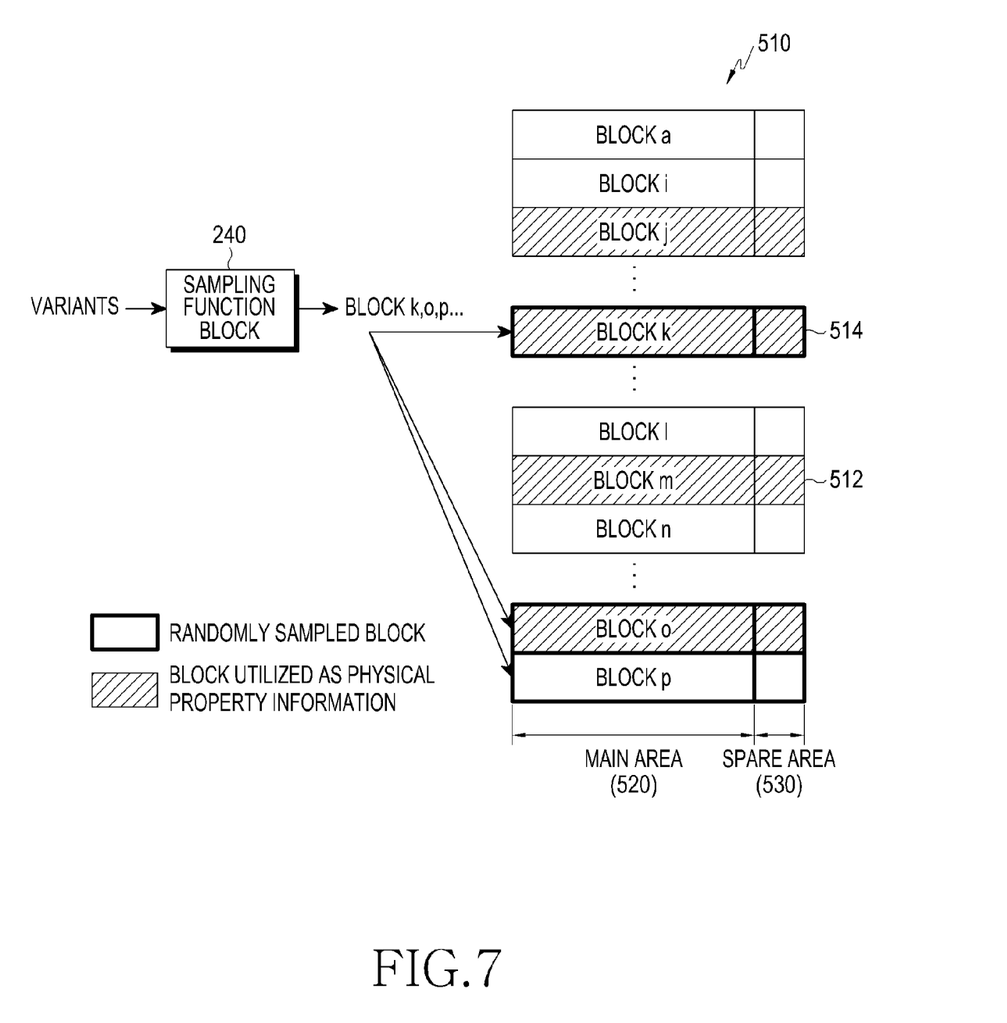
FIG. 7 is a diagram illustrating sampling of unit storage areas based on a set sampling size, according to an embodiment of the present invention.

FIG. 7 is a diagram illustrating a sampling of unit storage areas based on a set sampling size. Although the sampling size is set based on a block unit, as described above, additionally, the block of FIG. 7 may be replaced with a page when the sampling size is determined based on a page unit.

The memory 320 is formed of blocks a through p 510, and each block 510 may have a main area 520 formed of a plurality of pages and spare areas 530 following the pages. Blocks j, k, m, o, and p having a physical defect from among the blocks a through p 510 may be utilized as physical property information of the memory, and may indicate reference unit storage areas used for uniquely identifying the storage device 300. Information associated with a positional distribution of bad blocks is recorded in a bad block table. Also, in addition to the bad block table, a table including location information of each bad block and a bad cell in the bad block may be stored in a block (desirably, a block in a reserved status).

The sampling function block 240 may calculate a number of blocks N corresponding to a sampling size, based on variants, for example, a production X substituted in Equation (1), an expected value C of an average collision probability, and a block error rate p (bit error rate may be replaced with a block error rate in a block unit). The N blocks, for example, blocks k, o, and p may be randomly sampled.

The sampling function block 240 may output test data used for verifying the unit storage areas sampled in the secondary authentication information verification, in Step S70. For example, the test data may be a bit stream of the identical value ('0' or '1') having a size of a page or a block.

Obtaining a physical property of the sampled unit storage areas, in Step S40 corresponds to identifying a positional distribution of areas having a physical defect from among the sampled areas. In obtaining the physical property of the sampled unit storage areas, the authenticator 260 requests a test with respect to the sampled unit storage areas, and the memory controller 330 transmits, to the host device, a result of the test requested with respect to the sampled unit storage areas. The test corresponds to one of general memory operations, that is, reading, writing (that is, programming), and deleting, or a combination thereof, and the test data may be used for a write operation.

In the process of manufacturing the storage device 300, two stages of tests may be performed in association with a memory defect. A first-stage test corresponds to program/delete test based on a block unit. When a result of the test corresponds to failure, a corresponding block is marked to be a bad block (for example, a reserved word such as 000h is marked in a spare area). A second-stage test corresponds to a Read Disturbance test based on a page unit. A block that exceeds an error correction limit of an ECC block from among the blocks (or all blocks) that pass the first-stage test may be marked to be a bad block. Also, in addition to the bad block table, a table including location information of each block and a bad cell in the block may be stored in a block (desirably, a reserved block).

The memory defect is basically caused by a defect in a memory cell (a bit unit, a byte unit, or a word unit), and a bad cell having a physical defect may have a common property. For example, the bad cell may return a uniform value of '0' or '1' with respect to a read operation, may return a predetermined failure value with respect to a delete operation, and may return a predetermined completion value with respect to a write operation. The test may correspond to a process of detecting a bad cell or a bad block based on a return value obtained by performing one of the reading, writing, and deleting, or a combination thereof, or based on a return timing, for example, a response that takes longer than a predetermined normal time.

Specifically, a test command return value associated with the sampled blocks and an authentication criterion may be as follows. Particularly, Get_PartialPhysicalProperty (Sampling_Region, TestData) command may be configured of the combination of a program command, a read command, and a delete command, which are basic program operations provided by a conventional NAND flash memory. When an authenticated physical property is defined to be a return value of the program, read, and delete command and an operating time, Get_PartialPhysicalProperty may be understood as a process that obtains a return value of the program, read, and delete command, and obtains time information associated with a time expended in the memory controller 330. Specifically, in the case where a block becomes a bad block due to program failure and the like, it is generally read to be a value of 0 when a read operation is performed. When a program operation is performed, completion of an operation is immediately reported without a time delay since the program is already started. Particularly, with respect to a delete operation, deletion failure is returned. The operating time and the return value associated with the operation, which are different from a normal block, may be compared with a physical property value used for generating Authentication_Value and thus, authentication may be determined. In addition, a property of the bad block may be obtained through the memory controller 330 by marking a location of a bad cell where the program failure occurs in each page buffer or through use of an ECC algorithm, and the physical property may be distinguished.

The test in obtaining the physical property, in Step S40 includes one of the tests described in the manufacturing process, above, or a combination thereof.

The case of obtaining a bad block pattern is described below.

Referring to FIG. 5, the authenticator 260 requests the memory controller 330 to perform a test (for example, the Read Disturbance test as described in the foregoing) with respect to blocks k, o, and p through use of Get_PartialPhysicalProperty (Sampling_Region, TestData) command and the like, and the memory controller 330 may perform the test with respect to the blocks k, o, and p and transmits a result of the test to the authenticator 260. In this example, test data may be set to 'null'. For example, assuming that the blocks k and o are bad blocks, the memory 320 stores status data indicating positional distribution information associated with bad cells (that is, direct or indirect information indicating locations of bad cells) based on the test result. When the authenticator 260 requests the memory controller 330 to perform a read operation simultaneously or sequentially with respect to the blocks k, o, and p, the memory controller 330 transmits, to the host device 200 as a return value, status data stored in the memory 320 or a predetermined failure value (that is, a value indicating abnormality) associated with k and o and a predetermined success value (that is, a value indicating normality) associated with the block p.

The case of obtaining a poor cell pattern is described below.

The authenticator 260 requests the memory controller 330 to perform a test with respect to the page through use of Get_PartialPhysicalProperty (Sampling_Region, TestData) command and the like. The memory controller 330 may perform the test with respect to the page, and transmits a result of the test to the host device 200. In this example, test data is set to 'null'. The ECC block 340 may store positional distribution information associated with bad cells 420 (that is, direct or indirect information indicating locations of bad cells) based on the test result. The memory controller 330 transmits, to the host device 200 as a return value, data stored in the ECC block 340 or location information of a poor cell recognized by the data stored in the ECC block 340.

Hereinafter, a method of obtaining a physical property is described for each test described above, that is, a delete test, a program test, and a read test.

The delete test is described first, as follows. The memory 320 includes a page buffer that is generally referred to as an access circuit, and the page buffer may store status data generated as a result of performing a memory operation, that is, a program (write) operation, a read operation, or a delete operation. The status data includes a plurality of bits, for example, bits corresponding to a page unit.

The memory controller 330 may detect a location of a poor cell from the status data stored in the memory 320, and may identify a block including the poor cell to be a bad block. The memory controller 330 may provide the host device 200 with the status data, location information of the poor cell, or a bad block identification result, as a result of the test.

Figure 8:
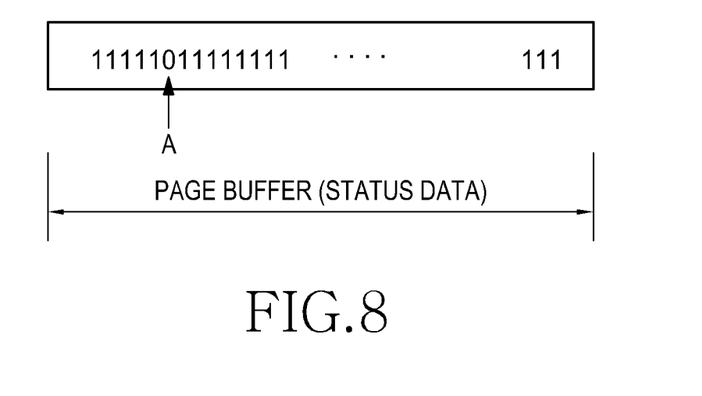
FIG. 8 is a diagram illustrating an example of status data stored in a memory based on a delete test, according to an embodiment of the present invention.

FIG. 8 is a diagram illustrating an example of status data stored in a memory based on a delete test. Here, it is assumed that each bit value of the status data is set to 0 before the delete operation starts. The bit value of the status data indicates a status of a corresponding memory cell (a value of 0 or 1). The delete operation is a memory operation that changes into 1, a status of a memory cell included in each of a plurality of pages forming a single block. A poor cell generated in the delete operation refers to a cell of which a status is not changed into 1 and remains to be 0.

As illustrated in FIG. 8, only a status of a sixth bit from among all bits forming the status data remains to be 0, and statuses of remaining bits are changed into 1. Therefore, the memory controller 330 may detect a location of a poor cell based on the bit values of the status data stored in the memory 320. The memory controller 330 may provide the host device 200 with the status data, location information of the poor cell, or a bad block identification result, as a result of the test.

The program test is described below.

Figure 9:
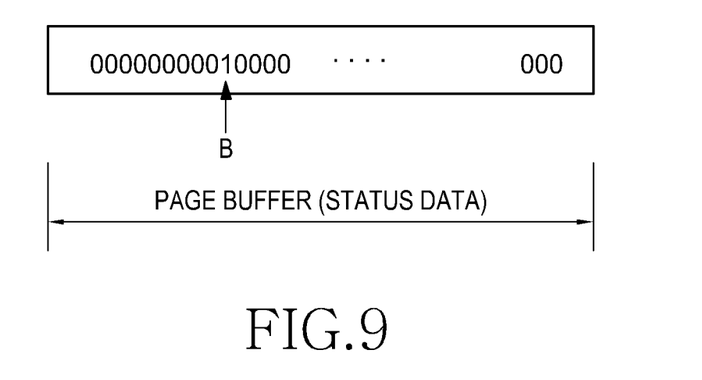
FIG. 9 is a diagram illustrating an example of status data stored in a memory based on a program test, according to an embodiment of the present invention.

FIG. 9 is a diagram illustrating an example of status data stored in a memory based on a program test.

Here, it is assumed that each bit value of the status data is set to 1 before a program operation starts. The program operation is a memory operation that changes a status of a few of all memory cells included in a single block or page into 0 based on source data. The program test changes statuses of all the memory cells into 0. A poor cell generated in the program operation refers to a cell of which a status is not changed into 0 and remains to be 1.

As illustrated in FIG. 9, only a status of a sixth bit from among all bits forming the status data remains to be 1, and statuses of remaining bits are changed into 0. Therefore, the memory controller 330 may detect a location of a poor cell based on the bit values of the status data stored in the memory 320. The memory controller 330 may provide the host device 200 with the state data, the location information of the poor cell, or the bad block identification result, as a result of the test.

The read test or the Read Disturbance test is described below.

In response to a request for a test from the host device 200, the memory controller 330 may control the memory 320 to perform a read operation. The memory controller 330 transmits a read command and an address to the memory 320 at a predetermined timing, and the memory 320 may read data from a page of a memory block corresponding to the address in response to the read command. The read data may be transmitted to the ECC block 340. The ECC block 340 may detect a read error associated with the read data, through use of ECC data stored in a spare area of the page. The ECC block 340 may store, in an internal register, a number of error bits (that is, a number of bad cells) and error location information (for example, address information) indicating a location where an error occurs (that is, a location of a poor cell).

The memory controller 330 determines whether the number of bad cells is greater than or equal to a predetermined ECC allow criterion (that is, an allowed number of bad cells), based on information stored in the ECC block 340. When the number of bad cells is greater than the predetermined ECC allow criterion, the memory controller 330 may identify the memory block to be a bad block. When a poor cell is generated in the read test, the memory controller 330 may detect a location of a poor cell from the information stored in the ECC block 340. The memory controller 330 may provide the host device 200 with the register data, the location information of the poor cell, or the bad block identification result, as a result of the test.

Obtaining the authentication information, in Step S50 may correspond to obtaining information associated with a positional distribution of defect reference areas used for uniquely identifying the storage device 300. Obtaining the authentication information, in Step S50, the authenticator 260 requests authentication information from the memory controller 330, and the memory controller 330 transmits the authentication information stored in the memory 320 to the host device 200.

The authentication information may be stored in a tamper resistance area (for example, a reserved block as described in the foregoing) by applying an encryption technology and the like during a process of manufacturing the storage device 300 or a trust worthy transaction time. For example, the authentication information may include bad block pattern information, poor cell pattern information, and the like.

The authentication information is information generated by a license agency or a reliable third party, and includes a block address, information associated with a defect included in a block or a cell, and the like. For example, it may be expressed that Authentication_Value=(Physical Property, Signature=Sign(PK_LicenseAgency, Physical Property)). That is, authentication information Authentication_Value may be formed of a physical property and an electronic signature value Signature of the license agency, and the electronic signature value may be a value obtained by signing on a hash value of a physical property through use of a private key PK_LicenseAgency of the license agency. The authentication information Authentication_Value may be data stored in the memory 320 in advance, or data generated by the memory controller 330 through use of component elements stored in the memory 320, that is, the private key PK_LicenseAgency of the license agency and the physical property.

Performing the primary authentication information verification, in Step S60, corresponds to a software authentication process of a Public Key Infrastructure (PKI). In the primary authentication information verification Step S60, the authenticator 260 may apply an already known public key of the license agency to the electronic signature value to decode the original hash value of the physical property, and may calculate a hash value of the physical property, and compare both values to perform primary authentication. The primary authentication information verification Step S60 may be an additional step which may be omissible. Although the Public Key Infrastructure (PM) is described above, additionally an encryption scheme such as a symmetric key encryption scheme and the like may be used.

Performing the secondary authentication information verification, in Step S70, corresponds to a hardware authentication process, and simultaneously, to determining similarity between a positional distribution obtained in Step S50 of obtaining the authentication information, and a positional distribution identified in Step S40 of obtaining the physical property. In the secondary authentication information verification step, in Step S70, the authenticator 260 determines whether a result of a test with respect to sampled unit storage areas received from the memory controller 330 (that is, return values) is identical or similar to the physical property.

Referring to FIG. 5, in the physical property, for example, a bad block table or pattern, blocks j, k, m, and o are marked to be bad blocks and remaining blocks are marked to be normal blocks. The test result indicates that the blocks k and o are bad blocks and the block p is a normal block. Therefore, the authenticator 260 determines that the return values with respect to sampled blocks received from the memory controller 330 are identical to the physical property. In the case of determining the similarity, whether a concordance rate between the return values and the physical property is greater than or equal to a predetermined threshold value (for example, 90%) may be determined.

Although FIG. 4 sequentially illustrates predetermined steps, alternatively, the step of obtaining the authentication information, in Step S50, may be performed before determining the version of the sampling function, in Step S10. Embodiments of the present invention may be embodied as hardware, software or a combination of hardware and software. Software may be stored in a volatile or non-volatile storage device such as Read Only Memory (ROM) and the like irrespective of erasing or rewriting, a memory such as a Random Access Memory (RAM), a memory chip, a device, and a integrated circuit, or a storage medium that is capable of performing optical or magnetic recording and machine-reading such as Compact Disc (CD), a Digital Versatile Disc (DVD), optical disc, magnetic tape, and the like. A storage unit may be configured as machine-readable storage media, suitable for storing a program including instructions to implement the methods and programs described above. Therefore, embodiments of the present invention may be configured to include a program including a code to implement a system or a method described herein, and may include a machine-readable storage medium including the program. The program may be transferred electronically through a medium such as a communication signal transferred through a wired or wireless connection, or an equivalent transfer medium. Further, the embodiments of the present invention may be configured and applied to an SSD, a flash memory card, a floppy disk, a flexible disk, a hard disk, a magnetic tape, a Compact Disc Read-Only Memory (CD-ROM), an optical disc, a Blue-ray disc, a Random Access Memory (RAM), a Programmable Read-Only Memory (PROM), an erasable PROM (EPROM), and a FLASH-EPROM.

Although various embodiments of the present invention have been described in detail herein, it will be apparent to those of ordinary skill in the art that variations and modifications may be made without departing from the spirit and scope of the present invention, as defined by the appended claims.

The invention claimed is:

1. A method for a host device to authenticate a storage device having a plurality of unit storage areas, the method comprising:
   receiving, from the storage device, authentication information including a table representing a positional distribution of defect reference areas used for uniquely identifying the storage device;
   sampling the unit storage areas of the storage device;
   identifying a positional distribution of areas having physical defects from among the sampled areas;
   determining similarity between the received positional distribution and the identified positional distribution; and
   authenticating the storage device based on a result of the determination.

2. The method as claimed in claim 1, wherein the table corresponds to a bad block table or a bad cell table stored in the storage device.

3. The method as claimed in claim 1, wherein sampling the unit storage areas of the storage device comprises:
   setting a sampling size; and
   sampling the unit storage areas corresponding to the sampling size from among all the unit storage areas of the storage device.

4. The method as claimed in claim 1, wherein the unit storage areas of the storage device are randomly sampled.

5. The method as claimed in claim 1, wherein identifying the positional distribution of areas comprises:
   performing a test on a predetermined memory operation with respect to the sampled areas; and
   determining whether the identified positional distribution is identical to the received positional distribution based on a return value associated with the test.

6. The method as claimed in claim 1, wherein identifying the positional distribution of areas comprises:
   performing a test on a predetermined memory operation with respect to the sampled area; and
   determining whether a concordance rate between the identified positional distribution and the received positional distribution is greater than or equal to a predetermined threshold value, based on a return value associated with the test.

7. The method as claimed in claim 1, further comprising:
   updating a sampling function,
   wherein the unit storage areas of the storage device are sampled according to the updated sampling function.

8. The method as claimed in claim 7, wherein updating the sampling function comprises:
   comparing a version of a second sampling function stored in the storage device and a version of a first sampling function stored in the host device; and
   replacing the first sampling function with the second sampling function when the version of the first sampling function is lower than the version of the second sampling function.

9. The method as claimed in claim 7, wherein updating the sampling function comprises:
   comparing a version of a third sampling function stored in a server connected through a network and a version of a first sampling function stored in the host device; and
   replacing the first sampling function with the third sampling function when the version of the first sampling function is lower than the version of the third sampling function.

10. The method as claimed in claim 9, further comprising:
    comparing the version of the substituted third sampling function and a version of a second sampling function stored in the storage device; and
    replacing the second sampling function with the third sampling function when the version of the second sampling function is lower than the version of the third sampling function.

11. The method as claimed in claim 8, further comprising:
    selecting one of a plurality of sampling functions stored in the host device based on sampling function selection information stored in the storage device,
    wherein the first sampling function is the selected sampling function.

12. The method as claimed in claim 1, further comprising:
    receiving a sampling function stored in a server connected through a network or the storage device, based on sampling function selection information stored in the storage device,
    wherein the sampling of the unit storage areas of the storage device is performed based on the received sampling function.

13. A non-transitory machine-readable storage medium having recorded thereon a program for executing a method for a host device to authenticate a storage device having a plurality of unit storage areas, the method comprising:
    receiving, from the storage device, authentication information including a table representing a positional distribution of defect reference areas used for uniquely identifying the storage device;
    sampling the unit storage areas of the storage device;
    identifying a positional distribution of areas having physical defects from among the sampled areas;
    determining similarity between the received positional distribution and the identified positional distribution; and
    authenticating the storage device based on a result of the determination.

14. The non-transitory machine-readable storage medium as claimed in claim 13, wherein the table corresponds to a bad block table or a bad cell table stored in the storage device.

15. The non-transitory machine-readable storage medium as claimed in claim 13, wherein the method further comprises:
    updating a sampling function,
    wherein the unit storage areas of the storage device are sampled according to the updated sampling function.

16. The non-transitory machine-readable storage medium as claimed in claim 15, wherein updating the sampling function comprises:
    comparing a version of a second sampling function stored in the storage device and a version of a first sampling function stored in the host device; and
    replacing the first sampling function with the second sampling function when the version of the first sampling function is lower than the version of the second sampling function.

17. The non-transitory machine-readable storage medium as claimed in claim 15, wherein updating the sampling function comprises:
    comparing a version of a third sampling function stored in a server connected through a network and a version of a first sampling function stored in the host device; and replacing the first sampling function with the third sampling function when the version of the first sampling function is lower than the version of the third sampling function.

18. The non-transitory machine-readable storage medium as claimed in claim 17, further comprising:
comparing the version of the substituted third sampling function and a version of a second sampling function stored in the storage device; and
replacing the second sampling function with the third sampling function when the version of the second sampling function is lower than the version of the third sampling function.

19. The non-transitory machine-readable storage medium as claimed in claim 16, further comprising:
selecting one of a plurality of sampling functions stored in the host device based on sampling function selection information stored in the storage device,
wherein the first sampling function is the selected sampling function.

* * * * *